Jan. 7, 1958
M. K. GILL
2,818,966
TRAVELING BELT CONVEYOR WITH POCKET COLLECTOR
FOR CONVEYING LIQUIDS AND SEMI-LIQUIDS
WITHOUT SPILLAGE
Filed March 3, 1954
3 Sheets-Sheet 2
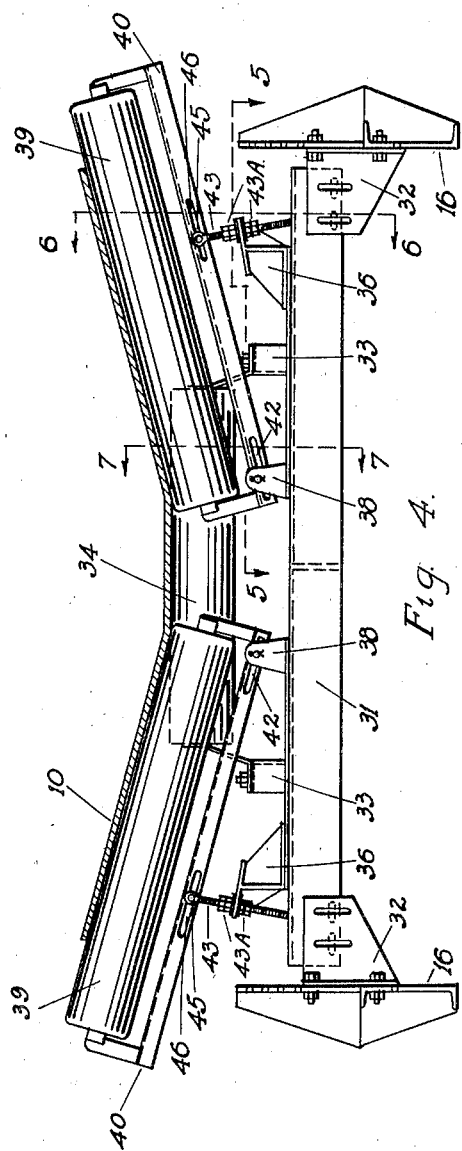
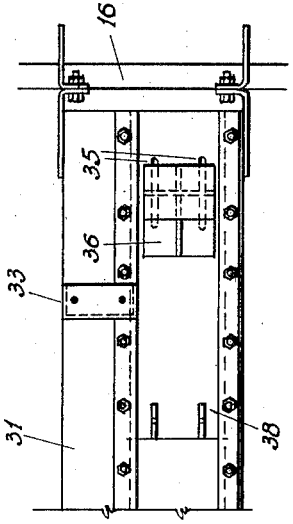
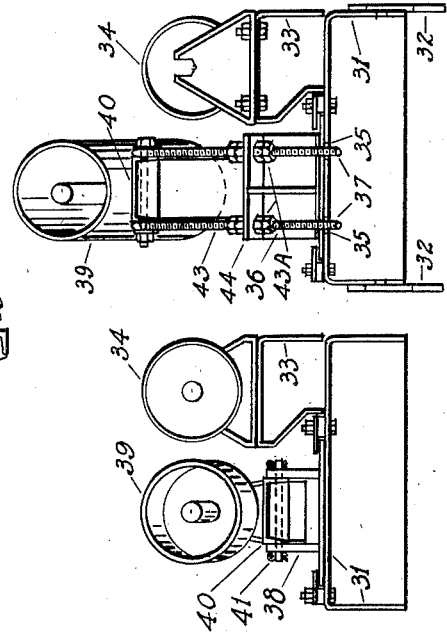
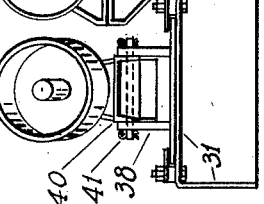
INVENTOR.
MELVILLE K. GILL
BY
*A. A. Deller*
ATTORNEY

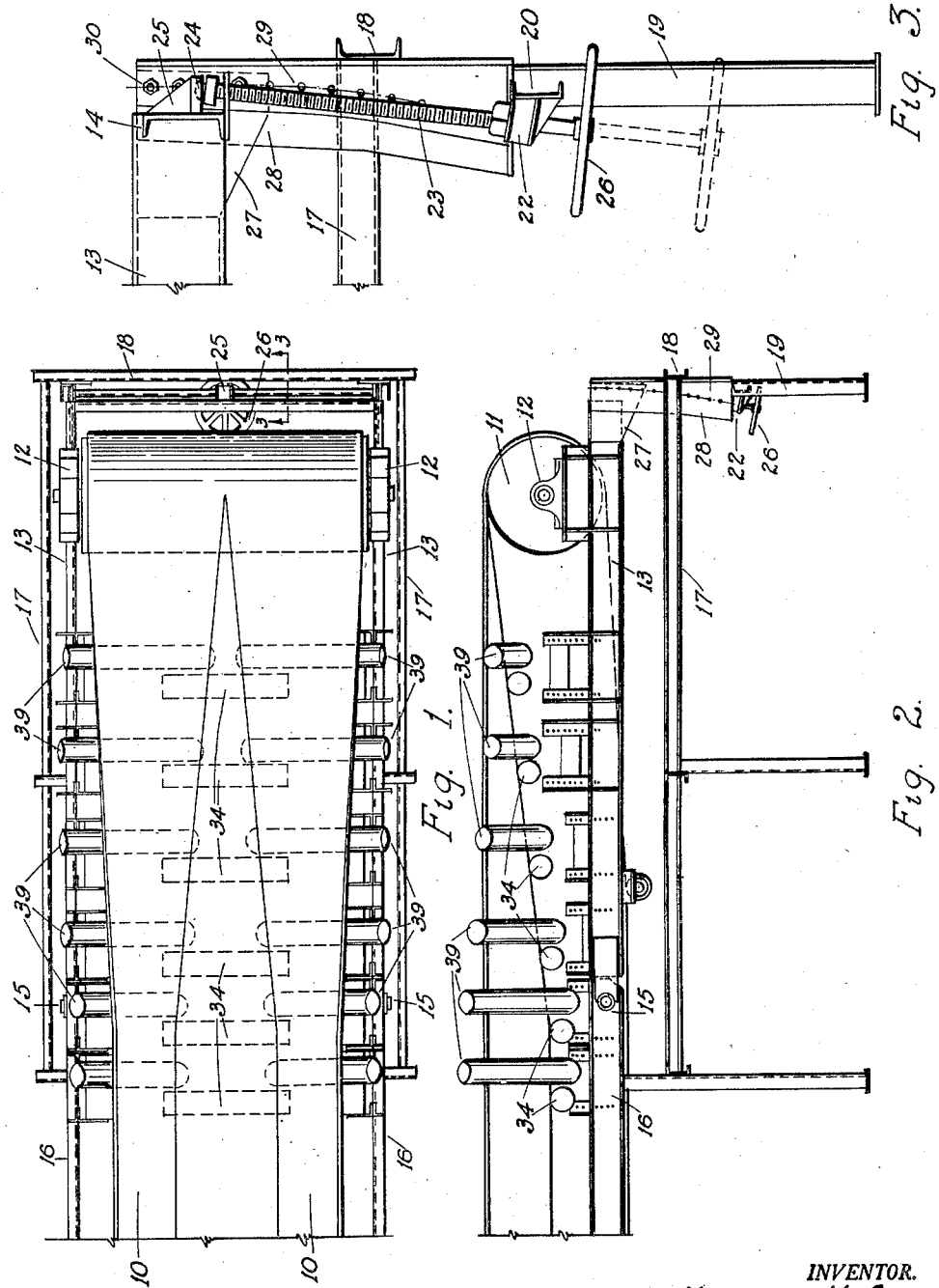

INVENTOR.
MELVILLE K GILL.
BY
ATTORNEY.

United States Patent Office 2,818,966
Patented Jan. 7, 1958

2,818,966

TRAVELING BELT CONVEYOR WITH POCKET COLLECTOR FOR CONVEYING LIQUIDS AND SEMI-LIQUIDS WITHOUT SPILLAGE

Melville K. Gill, Clearwater, Fla., assignor to Tennessee Corporation, New York, N. Y., a corporation of New York Application March 3, 1954, Serial No. 413,906

13 Claims. (Cl. 198—192)

The present invention relates to a traveling belt conveyor for collecting and conveying liquid or semi-liquid material without spillage, and, more particularly, to a troughing idler assembly for use in combination with a traveling belt conveyor to provide a collecting pocket at the point of loading having an appropriate depth and cross sectional area to permit loading of liquid or semi-liquid material without spillage.

A conveyor belt handling liquid or semi-liquid material presents problems in regard to loading that cannot be eliminated by troughing the belt in accordance with conventional practice in the art. A conventionally-troughed traveling belt conveyor passing beneath a loading point presents thereto a receiving trough which is substantially uniform in cross sectional shape and area throughout the full length of the belt between its loading and discharge points. Under such conditions, when the belt is loaded with liquid or semi-liquid material, some spillage is inevitable as well known by those skilled in the art.

In order to load a belt conveyor with a liquid or semi-liquid material without spillage, the shape and position of the belt at and adjacent the loading point must be appropriate to receive and retain the full volume of the influx, which requires that the depth and cross section area of the trough be properly dimensioned to suit the nature of the material, the quantity of material fed, the rate of feed, speed of the belt, etc. As these factors are variables, the proper position of the belt and shape of the trough cannot be predetermined and can only be obtained through belt adjustments suited to the operating conditions prevailing at any given time.

It is well known in the art to vary the shape of a conveyor belt trough by individual adjustment of idler rollers supporting its sides, whereby the degree of inclination of the rollers can be changed to meet different requirements. Typical examples of such practice are shown in the Steckel U. S. Patent No. 809,227 and in the Conners U. S. Patent No. 2,427,590. In all such cases, however, only angular adjustment of the rollers is possible. So far as the general usage of troughed conveyor belts is concerned, angular adjustment of the side supporting rollers is the only adjustment for which there is need. However, with regard to the use of a troughed belt to convey liquids or semi-liquids, angular adjustment of the sides of the trough at the loading point, without other adjustments, cannot be relied upon to prevent spillage in commercial operations on an industrial scale. As far as I am aware, the art prior to the present invention has not produced a practical solution of the problem of spillage of liquid or semi-liquid material from a troughed conveyor belt.

It has now been discovered that such spillage can be avoided by providing in the belt at and adjacent its loading point a collecting pocket supported by side and bottom rollers that are adjustable individually to give the belt shape, the pocket assembly being carried in a frame pivoted to be swung in a vertical arc to adjust the inclination of the pocket bottom relative to the horizontal and the various adjustments being coordinated to suit the particular material being fed, its quantity, its rate of feed, the speed of the belt, and other variable factors.

An object of the present invention is to provide, in a traveling belt conveyor assembly, troughing means including bottom rollers and angularly variable side rollers for shaping the belt, with the bottom rollers arranged for both vertical and horizontal adjustments and with the side rollers arranged for horizontal, vertical, and axial adjustments in addition to their angular adjustment.

Another object of the invention is to provide, in a traveling belt conveyor assembly, a collecting pocket section for receiving liquid or semi-liquid material without spillage, including belt shaping bottom and side rollers individually adjustable over a wide range of bodily movements, the entire section being arranged for swinging movement in a vertical arc relative to the general horizontal level of the conveyor.

Other objects and advantages will become apparent from the following description taken in conjunction with the accompanying drawings, in which:

Fig. 1 is a generally schematic top plan view of the tail end of the new traveling belt conveyor at and adjacent its point of loading;

Fig. 2 illustrates a side elevation relative to Fig. 1, with the tail end frame broken away to show an adjustment detail involved in the present invention;

Fig. 3 depicts in side elevation an adjustment detail at the tail end of the conveyor embodying the novel construction;

Fig. 4 is a transverse vertical sectional view on an enlarged scale through the conveyor substantially on the line 4—4 of Fig. 2;

Fig. 5 is a horizontal sectional view substantially on the line 5—5 of Fig. 4 with certain parts omitted for the purposes of clarity;

Fig. 6 depicts a vertical sectional view taken on the line 6—6 of Fig. 4;

Fig. 7 illustrates another vertical sectional view taken on the line 7—7 of Fig. 4;

Broadly stated, the invention contemplates a traveling belt conveyor of novel construction in which a section known as the tail or loading end is supported on a hinged joint to swing in a vertical arc relative to the longitudinal axis of the conveyor. This movable section, and at least an appreciable length of the conveyor immediately following, mounts a longitudinally spaced series of idler rollers which are individually adjustable to support and shape the belt into a trough along the longitudinal median of its load carrying flight. Those rollers which are within the confines of the hinged section move bodily with that section as a unit and function to shape the belt at and adjacent its loading point into a pocket for collecting liquid or semi-liquid material fed to the conveyor. Means are provided at the tail end of the conveyor frame to raise and lower the tail end belt pulley relative to the general horizontal level of the conveyor by swinging the hinged section on which the pulley is carried through its vertical arc of adjustment, whereby the position of the belt is changed to vary the degree of inclination of the pocket trough bottom as desired. This adjustment in combination with multiple adjustments of the individual troughing rollers enables the belt to receive and convey liquid or semi-liquid material without spillage.

Figure 8:
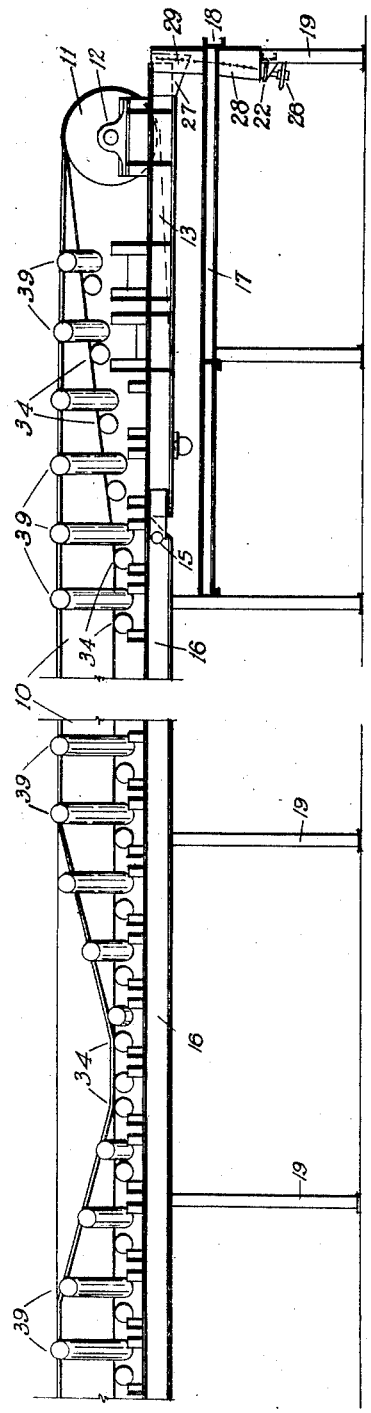
Fig. 8 is a view similar to Fig. 2 illustrating the discharge at one side near the head end of the conveyor.
Figure 9:
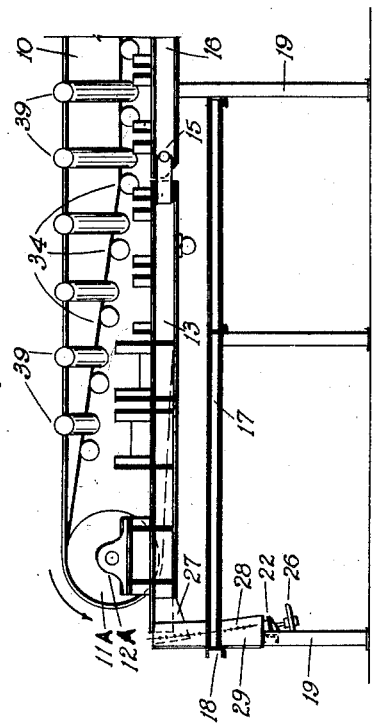
Fig. 9 is a view similar to Fig. 2 of the head pulley at the head end of the conveyor.

In carrying the invention into practice, it is preferred to use a multi-ply sheet rubber endless belt 10 trained over a tail pulley 11 (see Figs. 1 and 2) at the loading end of the traveling belt conveyor and driven by suitable conventional means, not shown. A head pulley 11A (see Fig. 9) journalled in bearings 12A carries the belt at the head end of the conveyor, and the belt is arranged at the general horizontal level of the conveyor as shown in the drawings to discharge, for example, from one side at a discharge point (see Fig. 8) located between the head and tail pulleys. In other words, the traveling belt conveyor is supported by longitudinally spaced series of idler rollers which carry and shape the belt into a trough along the longitudinal median of its load-carrying flight between the tail pulley 11 and the head pulley 11A.

The tail pulley is journalled in bearings 12 fixed on the side stringers 13 of a movable frame section that is completed by an end cross bar 14 extending between and rigidly secured to the two stringers. The inner end of each stringer 13 has a pivotal connection 15 to the adjacent end of a fixed side stringer 16 which is a part of the main frame of the conveyor, whereby the movable frame section is hinged to the fixed frame adjacent and slightly to the rear of the belt loading point.

The main frame of the conveyor further includes a sub-frame having side stringers 17 connected at the tail end by a transverse bar 18 extending therebetween and rigidly secured thereto and which is supported on legs 19. The legs are connected by a cross brace 20 spaced vertically beneath and parallel to the bar 18, which bar is provided at its center with an inwardly directed fixed bracket 21. A similar bracket 22 verticaly aligned with the bracket 21 is fixed to the cross brace 20. A traveling stem 23 is screw threaded through the two brackets with its upper end in sliding pivotal connection as at 24 with a bracket 25 fixed to the movable frame cross bar 14 in the vertical plane of the brackets 20 and 21. A hand wheel 26 secured on the lower end of the stem 23 provides a means by which the stem may be rotated to raise or lower the cross bar 14 and correspondingly shift the tail pulley 11 to various positions of adjustment in its arc of swing. The rear end of each stringer 13 of the hinged frame section has fixed thereon a rearwardly directed pin plate 27 laterally offset from an overlapping pin plate 28 fixed on the upper end of the adjacent main frame leg 19. The adjacent pin plates are provided with a series of bolt holes 29 in an arc concentric with the arc of travel of the tail pulley axis to receive clamping bolt and nut assemblies 30 by which a selected position of adjustment of the tail pulley may be maintained.

A series of longitudinally spaced belt troughing idler assemblies are disposed along the conveyor in supporting and guiding engagement with the underface of the upper flight of the belt 10. These assemblies extend from the tail pulley 11 to the discharge point and are shown in detail in Figs. 4 and 5. As they are substantially identical, a description of one will suffice for all.

Each troughing idler assembly comprises a mounting member 31 shown herein as a horizontal rectangular inverted channel sill disposed transversely between the side stringers 16 or 13 with its major axis in a vertical plane normal to the vertical plane of the longitudinal axis of the conveyor. The length of the sill is less than the distance between the stringers, and adjacent each end the sill flanges are longitudinally slotted to receive clamping nut and bolt units which are also received in vertical slots provided in vertically disposed angle plates 32 that are themselves attached to the frame side stringers by means enabling vertical adjustment thereon. It is apparent, therefore, that the sill can be raised or lowered and anchored in various positions of adjustment within the wide range permissible; furthermore, the sill may be shifted laterally relative to the stringers. Pillow blocks 33 are secured on the upper face of the sill at one side of its longitudinal median and provide bearings for the shaft of a bottom roller 34. The sill is further provided with longitudinal slots 35 arranged on the other side of its longitudinal median in parallel and at longitudinally spaced intervals to provide two sets of two pair each with the sets longitudinally aligned on opposite sides of the transverse center of the sill.

The outer end pair of slots in each set underlies the base of a support 36 that is slidable longitudinally on the sill for adjustment. The base of the support is apertured to receive the stems 37 of nut and bolt assemblies passed through the sill slots 35 whereby the support may be clamped in a position to which it is adjusted. The pair of the slots 35 at the inner end of each set has guiding engagement with the base of a second support 38 that also is slidable longitudinally on the sill. Side supporting rollers 39 are journaled in yokes 40 mounted on the supports.

The side rollers 39 are aligned transversely between the side stringers of the conveyor frame and are capable of angular adjustments through vertical arcs, pivoting at their inner ends on studs 41 carried by the supports 38 and slidably engaged in longitudinal slots 42 in the yokes 40. Angular adjustment of the rollers is effected by means of threaded bolts 43 slidably disposed through flange portions 44 of the supports 36 and clamped thereto in positions of adjustment by opposed nuts 43A as shown. These bolts have at their upper ends both a pivoted and a slidable engagement as at 45 in longitudinal slots 46 in the yokes 40, and the bolt ends are arranged for clamping engagement with the yokes to maintain positions of adjustment. It is thus apparent that the degree of inclination of the side rollers 39 may be varied over a wide range and that, independently of such angular adjustment, the rollers may be shifted axially over the range defined by the length of the yoke slots 46. These adjustments are in addition to the vertical adjustment obtainable by vertical shifting of the sill.

The various multiple adjustments described hereinbefore provide full adjustment for the troughing rollers: angular, vertical, and horizontal, as well as an axial adjustment. Independently of these adjustments and in cooperation therewith, there is a further adjustment for the tail pulley and the hinged frame section by which the position of the belt at and adjacent its loading point can be angularly adjusted with respect to the remainder of its load carrying flight. It is important that the belt be sufficiently flexible to adjust itself to the shapes set by the rollers.

Another feature of the invention is the overlapping relation in each individual idler assembly between the inner ends of the side rollers 39 and the bottom roller 34 and their close parallel arrangement, which precludes any possibility of pinching the belt or creasing it during its travel, which possibility is always present in the gaps between the adjoining ends of rollers having their axes in a common plane or which do not overlap at their adjoining ends.

A further feature of the invention is the provision of a traveling belt conveyor assembly which has a tail end or collecting pocket section for receiving liquid or semi-liquid material without spillage and belt-shaping bottom and side rollers. The assembly also has a horizontal main supporting frame or structure and an intermediate section of conveyor provided with adjustable bottom rollers arranged for both vertical and horizontal adjustments and side rollers arranged for horizontal, vertical and axial adjustment. These rollers are manually set according to the depth of liquid or semi-liquid to be carried. The head section of conveyor is likewise provided with belt-shaping adjustable rollers or idlers and with a head pulley arranged for vertical adjustment and for discharge of liquid or semi-liquid material. At the head pulley the belt pocket gradually decreases in depth and cross sectional area from the cross-shaping idler to the discharge point. The head pulley can be set either level with the top edge of the bottom horizontal rollers or below this level by adjustment of the pillow block support in bearings for convenient discharge of the material.

In operation, the individual rollers of the various troughing idler assemblies from the tail pulley 11 to a point well beyond the hinged frame pivots 15, and the vertical position of the tail pulley, are adjusted to shape the belt at its loading point into a pocket P properly dimensioned with reference to the specific nature of the material fed, its quantity, its rate of feed, the speed of the belt, etc., to receive the material without spillage. The rollers beyond the pocket are variously adjusted as required to maintain a trough in the belt of the proper shape and cross section area to prevent spillage until the discharge point is reached. In other words, the novel arrangement is such that the belt can be formed to suit the material fed to it (i. e., either liquid or solid) and this material can be handled to any point following the feed of the material until it is discharged.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An endless traveling belt conveyor assembly combination with a collecting pocket for conveying liquids and semi-liquids without spillage which comprises a main fixed frame, a movable sub-frame hinged to one end of said frame adjacent to a loading point and having a free end capable of moving through a vertical arc, a tail pulley mounted on said movable frame and capable of moving through said vertical arc with the said movable frame, adjusting means cooperatively associated with the free end of said movable frame to adjust it in a selected position in said vertical arc, a head pulley mounted at the other end of said main fixed frame adjacent to the discharge point, an endless belt passing around said tail pulley and said head pulley and above said main frame and said movable frame when conveying liquids and semi-liquids from the loading point to the discharge point, said belt at and adjacent to said tail pulley and loading point being provided with a collecting pocket capable of being swung in said vertical arc to adjust the shape and position of the belt and the bottom of said collecting pocket to receive and retain the full volume of influx of a load of liquid or semi-liquid without spillage, a series of longitudinally spaced belt troughing idler assemblies disposed from the loading point to the discharge point between said tail pulley and said head pulley for supporting and guiding the said endless belt above said main frame and said sub-frame, each of said belt troughing idler assemblies having a major axis in a vertical plane normal to a vertical plane of the longitudinal axis of the conveyor and being provided with multiple adjustments for angular, vertical horizontal and axial adjustments, each of said assemblies comprising a bottom roller, a pair of side rollers, a mounting member common to all said rollers, means cooperating with said mounting member and side rollers for angular adjustment of the side rollers relative to the axis of the bottom roller for shaping the contour of the belt to carry liquids and semi-liquids, and means cooperating with said first-named means for axial shifting of the side rollers to various positions of adjustment independently of their angular positions whereby the depth and cross section area of the trough of the belt and the collecting pocket can be properly dimensioned to suit the nature of liquid or semi-liquid loaded, the quantity of the liquid or semi-liquid material loaded, the rate of feed, the speed of the belt and other operating conditions prevailing at any given time and whereby liquids and semi-liquids can be loaded into the aforesaid collecting pocket and can be carried on the belt without spillage over the sides of the belt or over the loading end thereof.

2. An endless traveling belt conveyor assembly combination with a collecting pocket for conveying liquids and semi-liquids without spillage which comprises a main fixed frame, a movable sub-frame hinged to one end of said frame adjacent to a loading point and having a free end capable of moving through a vertical arc, a tail pulley mounted on said movable frame and capable of moving through said vertical arc with the said movable frame, adjusting means cooperatively associated with the free end of said movable frame to adjust it in a selected position in said vertical arc, a head pulley mounted at the other end of said main fixed frame adjacent to the discharge point, an endless belt passing around said tail pulley and said head pulley and above said main frame and said movable frame when conveying liquids and semi-liquids from the loading point to the discharge point, said belt at and adjacent to said tail pulley and loading point being provided with a collecting pocket capable of being swung in said vertical arc to adjust the shape and position of the belt and the bottom of said collecting pocket to receive and retain the full volume of influx of a load of liquid or semi-liquid without spillage, a series of longitudinally spaced belt troughing idler assemblies disposed from the loading point to the discharge point between said tail pulley and said head pulley for supporting and guiding the said endless belt above said main frame and said sub-frame, each of said belt troughing idler assemblies having a major axis in a vertical plane normal to a vertical plane of the longitudinal axis of the conveyor and being provided with multiple adjustments for angular, vertical, horizontal and axial adjustments, each of said assemblies comprising a bottom roller, a pair of axially aligned side rollers having their outer ends extending beyond the ends of said bottom idler and with their inner ends in spaced relation substantially overlapping the ends of said bottom roller, a mounting member common to all said rollers, means cooperating with said mounting member and side rollers for angular adjustment of the side rollers relative to the axis of the bottom roller for shaping the contour of the belt to carry liquids and semi-liquids and means cooperating with said first named means for axial shifting of the side rollers to various positions of adjustment independently of their angular positions whereby the depth and cross section area of the trough of the belt and the collecting pocket can be properly dimensioned to suit the nature of liquid or semi-liquid loaded, the quantity of the liquid or semi-liquid material loaded, the rate of feed, the speed of the belt and other operating conditions prevailing at any given time and whereby liquids and semi-liquids can be loaded into the aforesaid collecting pocket and can be carried on the belt without spillage over the sides of the belt or over the loading end thereof.

3. An endless traveling belt conveyor assembly combination with a collecting pocket for conveying liquids and semi-liquids without spillage which comprises a main fixed frame, a movable sub-frame hinged to one end of said frame adjacent to a loading point and having a free end capable of moving through a vertical arc, a tail pulley mounted on said movable frame and capable of moving through said vertical arc with the said movable frame, adjusting means cooperatively associated with the free end of said movable frame to adjust it in a selected position in said vertical arc, a head pulley mounted at the other end of said main fixed frame adjacent to the discharge point, an endless belt passing around said tail pulley and said head pulley and above said main frame and said movable frame when conveying liquids and semi-liquids from the loading point to the discharge point, said belt at and adjacent to said tail pulley and loading point being provided with a collecting pocket capable of being swung in said vertical arc to adjust the shape and position of the belt and the bottom of said collecting pocket to receive and retain the full volume of influx of a load of liquid or semi-liquid without spillage, a series of longitudinally spaced belt troughing idler assemblies disposed from the loading point to the discharge point between said tail pulley and said head pulley for supporting and guiding the said endless belt above said main frame and said sub-frame, each of said belt troughing idler assemblies having a major axis in a vertical plane normal to a vertical plane of the longitudinal axis of the conveyor and being provided with multiple adjustments for angular, vertical, horizontal and axial adjustments, each of said assemblies comprising a horizontal bottom roller, a pair of side rollers parallel thereto and in longitudinal alignment with their outer ends extending beyond the ends of said bottom roller and with their inner ends in spaced relation to substantially overlap the ends of said bottom roller, a mounting member common to all said rollers, means cooperating with said mounting member and side rollers for angular adjustment of the side rollers relative to the axis of the bottom roller for shaping the contour of the belt to carry liquids and semi-liquids, and means cooperating with said first named means for axial shifting of the side rollers to various positions of adjustment independently of their angular positions whereby the depth and cross section area of the trough of the belt and the collecting pocket can be properly dimensioned to suit the nature of liquid or semi-liquid loaded, the quantity of the liquid or semi-liquid mtaerial loaded, the rate of feed, the speed of the belt and other operating conditions prevailing at any given time and whereby liquids and semi-liquids can be loaded into the aforesaid collecting pocket and can be carried on the belt without spillage over the sides of the belt or over the loading end thereof.

4. An endless traveling belt conveyor assembly combination with a collecting pocket for conveying liquids and semi-liquids without spillage which comprises a main fixed frame, a movable sub-frame hinged to one end of said frame adjacent to a loading point and having a free end capable of moving through a vertical arc, a tail pulley mounted on said movable frame and capable of moving through said vertical arc with the said movable frame, adjusting means cooperatively associated with the free end of said movable frame to adjust it in a selected position in said vertical arc, a head pulley mounted at the other end of said main fixed frame adjacent to the discharge point, an endless belt passing around said tail pulley and said head pulley and above said main frame and said movable frame when conveying liquids and semi-liquids from the loading point to the discharge point, said belt at and adjacent to said tail pulley and loading point being provided with a collecting pocket capable of being swung in said vertical arc to adjust the shape and position of the belt and the bottom of said collecting pocket to receive and retain the full volume of influx of a load of liquid or semi-liquid without spillage, a series of longitudinally spaced belt troughing idler assembies disposed from the loading point to the discharge point between said tail pulley and said head pulley for supporting and guiding the said endless belt above said main frame and said sub-frame, each of said belt troughing idler assemblies having a major axis in a vertical plane normal to a vertical plane of the longitudinal axis of the conveyor and being provided with multiple adjustments for angular, vertical, horizontal and axial adjustments, each of said assemblies comprising a bottom roller, a pair of longitudinally aligned side rollers closely parallel thereto, an individual support for each of said side rollers, a mounting member common to said bottom roller and the supports for said side rollers, means cooperating with said mounting member and with each support for said side rollers for angular adjustment of the side rollers relative to the axis of the bottom roller for shaping the contour of the belt to carry liquids and semi-liquids, means cooperating with said first named means for axial shifting of the side rollers to various positions of adjustment independently of their angular positions, a supporting frame, and means connecting said mounting member and said supporting frame for vertical adjustment of said mounting member in the frame whereby the depth and cross section area of the trough of the belt and the collecting pocket can be properly dimensioned to suit the nature of liquid or semi-liquid loaded, the quantity of the liquid or semi-liquid material loaded, the rate of feed, the speed of the belt and other operating conditions prevailing at any given time and whereby liquids and semi-liquids can be loaded into the aforesaid collecting pocket and can be carried on the belt without spillage over the sides of the belt or over the loading end thereof.

5. An endless traveling belt conveyor assembly combination with a collecting pocket for conveying liquids and semi-liquids without spillage which comprises a main fixed frame, a movable sub-frame hinged to one end of said frame adjacent to a loading point and having a free end capable of moving through a vertical arc, a tail pulley mounted on said movable frame and capable of moving through said vertical arc with the said movable frame, adjusting means cooperatively associated with the free end of said movable frame to adjust it in a selected position in said vertical arc, a head pulley mounted at the other end of said main fixed frame adjacent to the discharge point, an endless belt passing around said tail pulley and said head pulley and above said main frame and said movable frame when conveying liquids and semi-liquids from the loading point to the discharge point, said belt at and adjacent to said tail pulley and loading point being provided with a collecting pocket capable of being swung in said vertical arc to adjust the shape and position of the belt and the bottom of said collecting pocket to receive and retain the full volume of influx of a load of liquid or semi-liquid without spillage, a series of longitudinally spaced belt troughing idler assemblies disposed from the loading point to the discharge point between said tail pulley and said head pulley for supporting and guiding the said endless belt above said main frame and said sub-frame, each of said belt troughing idler assemblies having a major axis in a vertical plane normal to a vertical plane of the longitudinal axis of the conveyor and being provided with multiple adjustments for angular, vertical, horizontal and axial adjustments, each of said assemblies comprising a bottom roller, a pair of longitudinally aligned side rollers closely parallel thereto, an individual support for each of said side rollers, a mounting member common to said bottom roller and the supports for said side rollers, means cooperating with said mounting member and with each support for said side rollers for angular adjustment of the side rollers relative to the axis of the bottom roller for shaping the contour of the belt to carry liquids and semi-liquids, means cooperating with said first named means for axial shifting of the side rollers to various positions of adjustment independently of their angular positions, a supporting frame, and means connecting said mounting member and said supporting frame for vertical adjustment of said mounting member in the frame, said mounting member having also a connection with said frame for lateral adjustment of the mounting member relative to said frame whereby the depth and cross section area of the trough of the belt and the collecting pocket can be properly dimensioned to suit the nature of liquid or semi-liquid loaded, the quantity of the liquid or semi-liquid material loaded, the rate of feed, the speed of the belt and other operating conditions prevailing at any given time and whereby liquids and semi-liquids can be loaded into the aforesaid collecting pocket and can be carried on the belt without spillage over the sides of the belt or over the loading end thereof.

6. An endless traveling belt conveyor assembly combination with a collecting pocket for conveying liquids and semi-liquids without spillage which comprises a main fixed frame, a movable sub-frame hinged to one end of said frame adjacent to a loading point and having a free end capable of moving through a vertical arc, a tail pulley mounted on said movable frame and capable of moving through said vertical arc with the said movable frame, adjusting means cooperatively associated with the free end of said movable frame to adjust it in a selected position in said vertical arc, a head pulley mounted at the other end of said main fixed frame adjacent to the discharge point, an endless belt passing around said tail pulley and said head pulley and above said main frame and said movable frame when conveying liquids and semi-liquids from the loading point to the discharge point, said belt at and adjacent to said tail pulley and loading point being provided with a collecting pocket capable of being swung in said vertical arc to adjust the shape and position of the belt and the bottom of said collecting pocket to receive and retain the full volume of influx of a load of liquid or semi-liquid without spillage, a series of longitudinally spaced belt troughing idler assemblies disposed from the loading point to the discharge point between said tail pulley and said head pulley for supporting and guiding the said endless belt above said main frame and said sub-frame, each of said belt troughing idler assemblies having a major axis in a vertical plane normal to a vertical plane of the longitudinal axis of the conveyor and being provided with multiple adjustments for angular, vertical, horizontal and axial adjustments, each of said assemblies comprising a horizontal bottom roller, a pair of longitudinally aligned side rollers parallel thereto and overlapping the same at their inner ends, a supporting frame, a mounting member common to all said rollers and having a connection with said supporting frame for lateral adjustment of the mounting member horizontally within the supporting frame, means cooperating with said mounting member and side rollers for angular adjustment of the side rollers relative to the axis of the bottom roller for shaping the contour of the belt to carry liquids and semi-liquids, and means cooperating with said first named means for axial shifting of the side rollers to various positions of adjustment independently of their angular positions whereby the depth and cross section area of the trough of the belt and the collecting pocket can be properly dimensioned to suit the nature of liquid or semi-liquid loaded, the quantity of the liquid or semi-liquid material loaded, the rate of feed, the speed of the belt and other operating conditions prevailing at any given time and whereby liquids and semi-liquids can be loaded into the aforesaid collecting pocket and can be carried on the belt without spillage over the sides of the belt or over the loading end thereof.

7. An endless traveling belt conveyor assembly combination with a collecting pocket for conveying liquids and semi-liquids without spillage which comprises a main fixed frame, a movable sub-frame hinged to one end of said frame adjacent to a loading point and having a free end capable of moving through a vertical arc, a tail pulley mounted on said movable frame and capable of moving through said vertical arc with the said movable frame, adjusting means cooperatively associated with the free end of said movable frame to adjust it in a selected position in said vertical arc, a head pulley mounted at the other end of said main fixed frame adjacent to the discharge point, an endless belt passing around said tail pulley and said head pulley and above said main frame and said movable frame when conveying liquids and semi-liquids from the loading point to the discharge point, said belt at and adjacent to said tail pulley and loading point being provided with a collecting pocket capable of being swung in said vertical arc to adjust the shape and position of the belt and the bottom of said collecting pocket to receive and retain the full volume of influx of a load of liquid or semi-liquid without spillage, a series of longitudinally spaced belt troughing idler assemblies disposed from the loading point to the discharge point between said tail pulley and said head pulley for supporting and guiding the said endless belt above said main frame and said sub-frame, each of said belt troughing idler assemblies having a major axis in a vertical plane normal to a vertical plane of the longitudinal axis of the conveyor and being provided with multiple adjustments for angular, vertical, horizontal and axial adjustments, each of said assemblies comprising a supporting frame, a bottom roller, a pair of side rollers, a mounting member common to all said rollers and having connection with said supporting frame for bodily movement therein to different positions of adjustment, support means for said side rollers carried by and movable on said mounting member to various positions of adjustment thereon for shaping the contour of the belt to carry liquids and semi-liquids, and means cooperating with said side rollers and their support means for angular adjustment of the side rollers relative to the axis of the bottom roller whereby the depth and cross section area of the trough of the belt and the collecting pocket can be properly dimensioned to suit the nature of liquid or semi-liquid loaded, the quantity of the liquid or semi-liquid material loaded, the rate of feed, the speed of the belt and other operating conditions prevailing at any given time and whereby liquids and semi-liquids can be loaded into the aforesaid collecting pocket and can be carried on the belt without spillage over the sides of the belt or over the loading end thereof.

8. An endless traveling belt conveyor assembly combination with a collecting pocket for conveying liquids and semi-liquids without spillage which comprises a main fixed frame, a movable sub-frame hinged to one end of said frame adjacent to a loading point and having a free end capable of moving through a vertical arc, a tail pulley mounted on said movable frame and capable of moving through said vertical arc with the said movable frame, adjusting means cooperatively associated with the free end of said movable frame to adjust it in a selected position in said vertical arc, a head pulley mounted at the other end of said main fixed frame adjacent to the discharge point, an endless belt passing around said tail pulley and said head pulley and above said main frame and said movable frame when conveying liquids and semi-liquids from the loading point to the discharge point, said belt at and adjacent to said tail pulley and loading point being provided with a collecting pocket capable of being swung in said vertical arc to adjust the shape and position of the belt and the bottom of said collecting pocket to receive and retain the full volume of influx of a load of liquid or semi-liquid without spillage, a series of longitudinally spaced belt troughing idler assemblies disposed from the loading point to the discharge point between said tail pulley and said head pulley for supporting and guiding the said endless belt above said main frame and said sub-frame, each of said belt troughing idler assemblies having a major axis in a vertical plane normal to a vertical plane of the longitudinal axis of the conveyor and being provided with multiple adjustments for angular, vertical, horizontal and axial adjustments, each of said assemblies comprising a supporting frame, a bottom roller, a pair of side rollers, a mounting member common to all said rollers and having connection with said supporting frame for bodily movement therein to different positions of adjustment vertically relative thereto, support means for said side rollers carried by and movable on said mounting member to various positions of adjustment thereon, for shaping the contour of the belt to carry liquids and semi-liquids, and means cooperating with said side rollers and their support means for angular adjustment of the side rollers relative to the axis of the bottom roller whereby the depth and cross section area of the trough of the belt and the collecting pocket can be properly dimensioned to suit the nature of liquid or semi-liquid loaded, the quantity of the liquid or semi-liquid material loaded, the rate of feed, the speed of the belt and other operating conditions prevailing at any given time and whereby liquids and semi-liquids can be loaded into the aforesaid collecting pocket and can be carried on the belt without spillage over the sides of the belt or over the loading end thereof.

9. An endless traveling belt conveyor assembly combination with a collecting pocket for conveying liquids and semi-liquids without spillage which comprises a main fixed frame, a movable sub-frame hinged to one end of said frame adjacent to a loading point and having a free end capable of moving through a vertical arc, a tail pulley mounted on said movable frame and capable of moving through said vertical arc with the said movable frame, adjusting means cooperatively associated with the free end of said movable frame to adjust it in a selected position in said vertical arc, a head pulley mounted at the other end of said main fixed frame adjacent to the discharge point, an endless belt passing around said tail pulley and said head pulley and above said main frame and said movable frame when conveying liquids and semi-liquids from the loading point to the discharge point, said belt at and adjacent to said tail pulley and loading point being provided with a collecting pocket capable of being swung in said vertical arc to adjust the shape and position of the belt and the bottom of said collecting pocket to receive and retain the full volume of influx of a load of liquid or semi-liquid without spillage, a series of longitudinally spaced belt troughing idler assemblies disposed from the loading point to the discharge point between said tail pulley and said head pulley for supporting and guiding the said endless belt above said main frame and said sub-frame, each of said belt troughing idler assemblies having a major axis in a vertical plane normal to a vertical plane of the longitudinal axis of the conveyor and being provided with multiple adjustments for angular, vertical, horizontal and axial adjustments, each of said assemblies comprising a supporting frame, a bottom roller, a pair of side rollers, a mounting member common to all said rollers and having connection with said supporting frame for bodily movement therein laterally to different positions of adjustment, individual support means for said side rollers carried by and movable on said mounting member to various positions of adjustment longitudinally thereof for shaping the contour of the belt to carry liquids and semi-liquids, and means cooperating with said side rollers and their support means for angular adjustment of the side rollers relative to the axis of the bottom roller whereby the depth and cross section area of the trough of the belt and the collecting pocket can be properly dimensioned to suit the nature of liquid or semi-liquid loaded, the quantity of the liquid or semi-liquid material loaded, the rate of feed, the speed of the belt and other operating conditions prevailing at any given time and whereby liquids and semi-liquids can be loaded into the aforesaid collecting pocket and can be carried on the belt without spillage over the sides of the belt or over the loading end thereof.

10. An endless traveling belt conveyor assembly combination with a collecting pocket for conveying liquids and semi-liquids without spillage which comprises a main fixed frame, a movable sub-frame hinged to one end of said frame adjacent to a loading point and having a free end capable of moving through a vertical arc, a tail pulley mounted on said movable frame and capable of moving through said vertical arc with the said movable frame, adjusting means cooperatively associated with the free end of said movable frame to adjust it in a selected position in said vertical arc, a head pulley mounted at the other end of said main fixed frame adjacent to the discharge point, an endless belt passing around said tail pulley and said head pulley and above said main frame and said movable frame when conveying liquids and semi-liquids from the loading point to the discharge point, said belt at and adjacent to said tail pulley and loading point being provided with a collecting pocket capable of being swung in said vertical arc to adjust the shape and position of the belt and the bottom of said collecting pocket to receive and retain the full volume of influx of a load of liquid or semi-liquid without spillage, a series of longitudinally spaced belt troughing idler assemblies disposed from the loading point to the discharge point between said tail pulley and said head pulley for supporting and guiding the said endless belt above said main frame and said sub-frame, each of said belt troughing idler assemblies having a major axis in a vertical plane normal to a vertical plane of the longitudinal axis of the conveyor and being provided with multiple adjustments for angular, vertical, horizontal and axial adjustments, each of said assemblies comprising a supporting frame, a bottom roller, a pair of side rollers, a mounting member common to all said rollers and having connection with said supporting frame for bodily movement therein to different positions of adjustment both vertically and laterally relative thereto, support means for said side rollers carried by and movable on said mounting member to various positions of adjustment thereon for shaping the contour of the belt to carry liquids and semi-liquids, and means cooperating with said side rollers and their support means for angular adjustment of the side rollers relative to the axis of the bottom roller whereby the depth and cross section area of the trough of the belt and the collecting pocket can be properly dimensioned to suit the nature of liquid or semi-liquid loaded, the quantity of the liquid or semi-liquid material loaded, the rate of feed, the speed of the belt and other operating conditions prevailing at any given time and whereby liquids and semi-liquids can be loaded into the aforesaid collecting pocket and can be carried on the belt without spillage over the sides of the belt or over the loading end thereof.

11. The traveling belt conveyor combination set forth in claim 10 in which the side rollers have a connection with their supporting means for axial adjustment of the side rollers independently of the adjustment of their supporting means relative to the mounting member.

12. The traveling belt conveyor combination set forth in claim 1, in which the movable frame is provided with a hinged connection with the main frame adjacent and slightly to the rear of the belt loading point and is adapted to swing in a vertical arc relative to the general horizontal level of the main frame, a tail pulley is carried by said movable frame to change the movable frame through its arc of swing to various positions of adjustment, shaping the flight of said belt to support or carry a liquid or semi-liquid such as a fluid like water or an acid or salt solution or a semi-liquid such as a water and solid mixture like a slurry which on being deposited on the belt and being conveyed, is carried and contained by the particular shape of the belt imparted thereby.

13. The traveling belt conveyor combination set forth in claim 1, in which the movable frame is provided with a hinged connection with the main frame adjacent and slightly to the rear of the belt loading point and is adapted to swing in a vertical arc relative to the general horizontal level of the main frame, a tail pulley is carried by said movable frame, a conveyor belt is trained over said pulley, means are provided for cooperating with said main frame and movable frame section to move the movable frame through its arc of swing into various positions of adjustment, a plurality of troughing idler assemblies are located between the tail pulley and the head pulley for supporting and shaping the load carrying flight of said belt to a contour capable of carrying liquids and semi-liquids without spillage over the sides of the belt or over the end pulley at loading end, each of said assemblies comprising a bottom roller and angularly adjustable side rollers and a mounting means common thereto, means supporting the side rollers on the mounting means and movable on the mounting means for adjustment, said side rollers being arranged for axial shifting on their supporting means, and said mounting means being arranged for vertical adjustment relative to said main frame and the movable frame section to the proper shape of the belt to contain the liquid or semi-liquid, each liquid or semi-liquid depending upon its physical properties, such as viscosity, surface tension and specific gravity requiring a distinct adjustment of the vertical adjustment and axial shifting of side rollers to insure carrying capacity of the belt.

References Cited in the file of this patent

UNITED STATES PATENTS

| | | |
|---|---|---|
| 977,987 | Willson | Dec. 6, 1910 |
| 1,762,772 | Fisher | June 10, 1930 |
| 2,376,128 | Dauenhauer | May 15, 1945 |
| 2,427,590 | Conners | Sept. 16, 1947 |
| 2,592,532 | Beck | Apr. 15, 1952 |

FOREIGN PATENTS

| | | |
|---|---|---|
| 45,285 | Germany | Nov. 23, 1888 |